(12) United States Patent
Sarin

(10) Patent No.: US 11,922,414 B2
(45) Date of Patent: Mar. 5, 2024

(54) SYSTEM AND METHOD FOR OPTIMIZING DATA WRITING TO A BLOCKCHAIN

(71) Applicant: PayPal, Inc., San Jose, CA (US)

(72) Inventor: Pankaj Sarin, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/566,382

(22) Filed: Dec. 30, 2021

(65) Prior Publication Data
US 2022/0129889 A1 Apr. 28, 2022

Related U.S. Application Data

(63) Continuation of application No. 16/191,892, filed on Nov. 15, 2018, now abandoned.

(51) Int. Cl.
| | |
|---|---|
| *G06Q 20/38* | (2012.01) |
| *G06F 16/23* | (2019.01) |
| *H04L 9/06* | (2006.01) |
| *H04L 9/00* | (2022.01) |

(52) U.S. Cl.
CPC ....... *G06Q 20/389* (2013.01); *G06F 16/2379* (2019.01); *H04L 9/0637* (2013.01); *H04L 9/50* (2022.05)

(58) Field of Classification Search
CPC ............. H04L 67/1097; H04L 67/1095; H04L 9/3247
See application file for complete search history.

(56) References Cited

U.S. PATENT DOCUMENTS

| | | |
|---|---|---|
| 2010/0161677 A1 | 6/2010 | Zurek et al. |
| 2014/0279299 A1 | 9/2014 | Erenrich |
| 2015/0332283 A1 | 11/2015 | Witchey |
| 2016/0292672 A1 | 10/2016 | Fay et al. |
| 2016/0330034 A1 | 11/2016 | Back et al. |
| 2017/0236120 A1 | 8/2017 | Herlihy et al. |
| 2018/0096360 A1 | 4/2018 | Christidis |

(Continued)

FOREIGN PATENT DOCUMENTS

| | | |
|---|---|---|
| CN | 107615317 A | 1/2018 |
| CN | 107924389 A | 4/2018 |

(Continued)

OTHER PUBLICATIONS

Extended European Search Report for Application No. 19885368.1 dated Mar. 16, 2022, 13 pages.

(Continued)

*Primary Examiner* — Ojo O Oyebisi
(74) *Attorney, Agent, or Firm* — HAYNES AND BOONE, LLP

(57) ABSTRACT

A mempool of a miner of a blockchain system is accessed. The mempool contains at least a first transaction and a second transaction. A determination is made that the first transaction and the second transaction are related to each other. In response to the determination, the first transaction and the second transaction are linked. The linking of the first and second transactions comprises aggregating data associated with the first transaction and the second transaction into an aggregated data set. The aggregated data set is written into a single block of the blockchain system.

20 Claims, 8 Drawing Sheets

(56) References Cited

U.S. PATENT DOCUMENTS

2018/0139278 A1* 5/2018 Bathen .................. H04L 9/3247
2018/0189333 A1   7/2018 Childress et al.

FOREIGN PATENT DOCUMENTS

CN    108305056 A    7/2018
WO    2017087769 A1  5/2017

OTHER PUBLICATIONS

Antonopoulos A.M., "Mastering Bitcoin, Programming the Open Blockchain," O'Reilly, Second Edition, Jul. 21, 2017, Retrieved from Internet URL: https://www.oreilly.com/library/view/mastering-bitcoin-2nd/9781491954379/copyright-page01.html, Retrieved on Mar. 18, 2019, 405 pages.

International Appl. No. PCT/US2019/061570, International Search Report and Written Opinion dated Feb. 3, 2020, 10 pages.

International Application No. PCT/US2019/061570, International Preliminary Report on Patentability dated May 27, 2021, 8 pages.

Partial Supplementary European Search Report for Application No. 19885368.1 dated Dec. 13, 2021, 16 pages.

Portnoff R.S., et al., "Backpage and Bitcoin: Uncovering Human Traffickers," In Proceedings of the 23rd ACM SIGKDD International Conference on Knowledge Discovery and Data Mining, Aug. 17, 2017, Retrieved from the Internet: https://www.cs.princeton.edu/~yuxingh/static/kdd17-backpage.pdf on Jan. 11, 2020, 10 pages.

Miller et al. "Permacoin: Repurposing bitcoin work for data preservation." In: 2014 IEEE Symposium on Security and Privacy. May 21, 2014 (May 21, 2014) Retrieved on Jan. 11, 2020 (Jan. 11, 2020) from <https://ieeexplore.ieee.org/ielx7/6954656/6956545/06956582.pdf?tp=&arnumber=6956582&isnumber=6956545&ref=aHR0cHM6Ly9zY2hvbGFylmdvb2dsZS5jb20vc2Nob2xhcj9hc19ZHQ9MSw0NCZxPWErdGVtcG9yYXJ5K3N0b3JhZ2UrcGxhY2UrZm9yK3RoZSttaW5IZCt0cmFuc2FjdGlvbnMrbm90K3RldCtzdG9yZWQraW4rdGhlK2Jsb2NrY2hhaW4maGw9ZW4=> entire document.

* cited by examiner

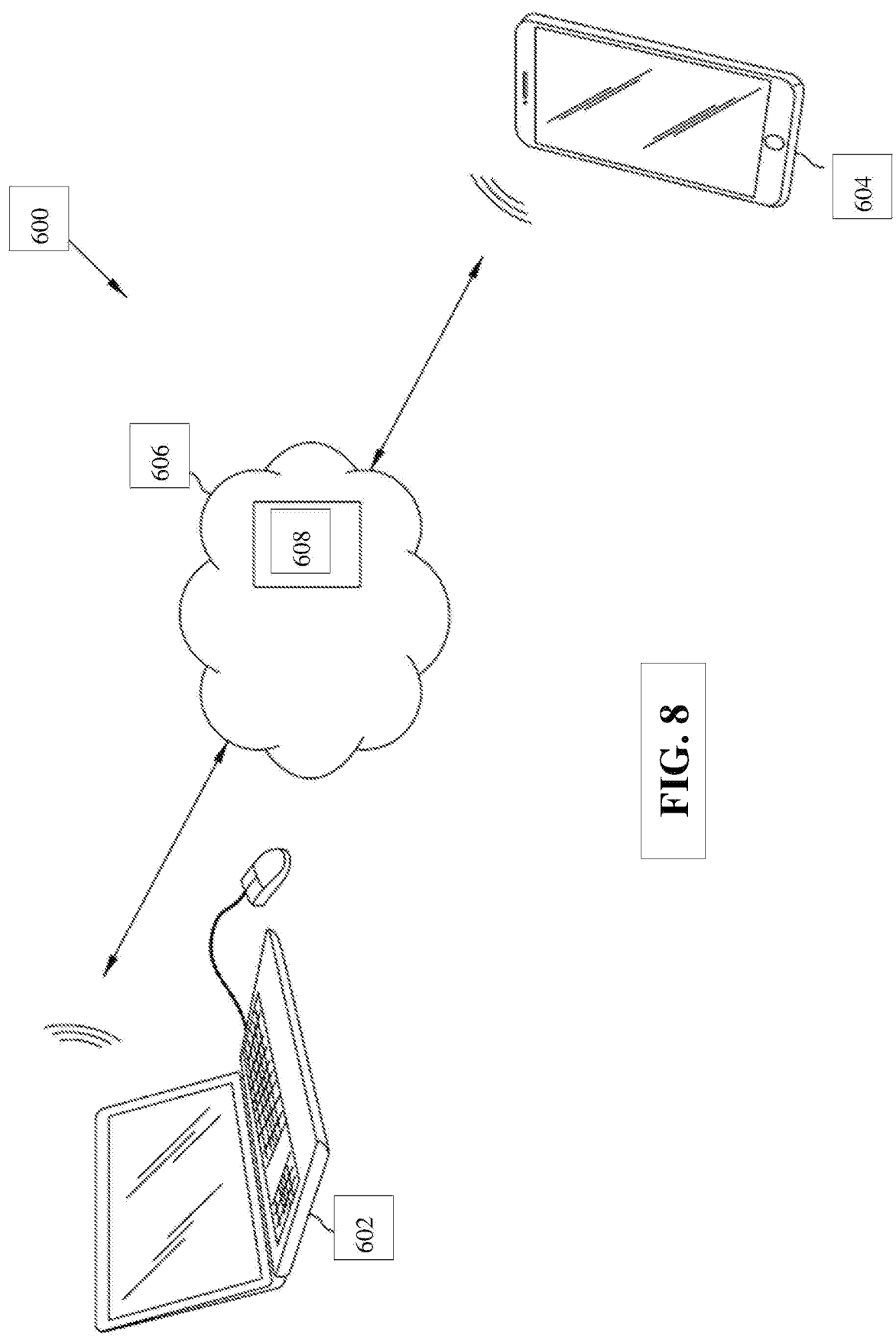

SYSTEM AND METHOD FOR OPTIMIZING DATA WRITING TO A BLOCKCHAIN

CROSS REFERENCE TO RELATED APPLICATIONS

The present application is a continuation application of U.S. patent application Ser. No. 16/191,892, filed Nov. 15, 2018, and is incorporated in reference in its entirety.

BACKGROUND

Field of the Invention

The present invention generally relates to blockchain technology, and more particularly to automatically re-assigning priority levels of mempool data of a miner in a blockchain system, according to various embodiments.

Related Art

Rapid advances have been made in the past several decades in the fields of computer technology and telecommunications, and businesses and end users now engage in electronic activities more than ever. Recently, blockchain technology has been introduced to improve the security of electronic transactions. A blockchain system may comprise a growing list of records (also called blocks) that are linked together using cryptography. Compared to conventional systems, blockchain systems are more resistant to the modification of the data stored in the blocks and are therefore offers protection against hacking. However, existing blockchain systems may still have various shortcomings. For example, existing blockchain systems do not consider whether seemingly separate transactions are actually related to each other. As a result, multiple transactions—that are related to one another—may be written into the blockchain system as separate transactions and occupy separate blocks, which may be a waste of resources and/or degrade the efficiency of the blockchains. What is needed is a system and method to automatically determine whether seemingly different transactions are actually related to one another and perform blockchain writing accordingly.

BRIEF DESCRIPTION OF THE FIGURES

FIG. 8 is a simplified example of a cloud-based computing architecture according to various aspects of the present disclosure.

Figure 1:
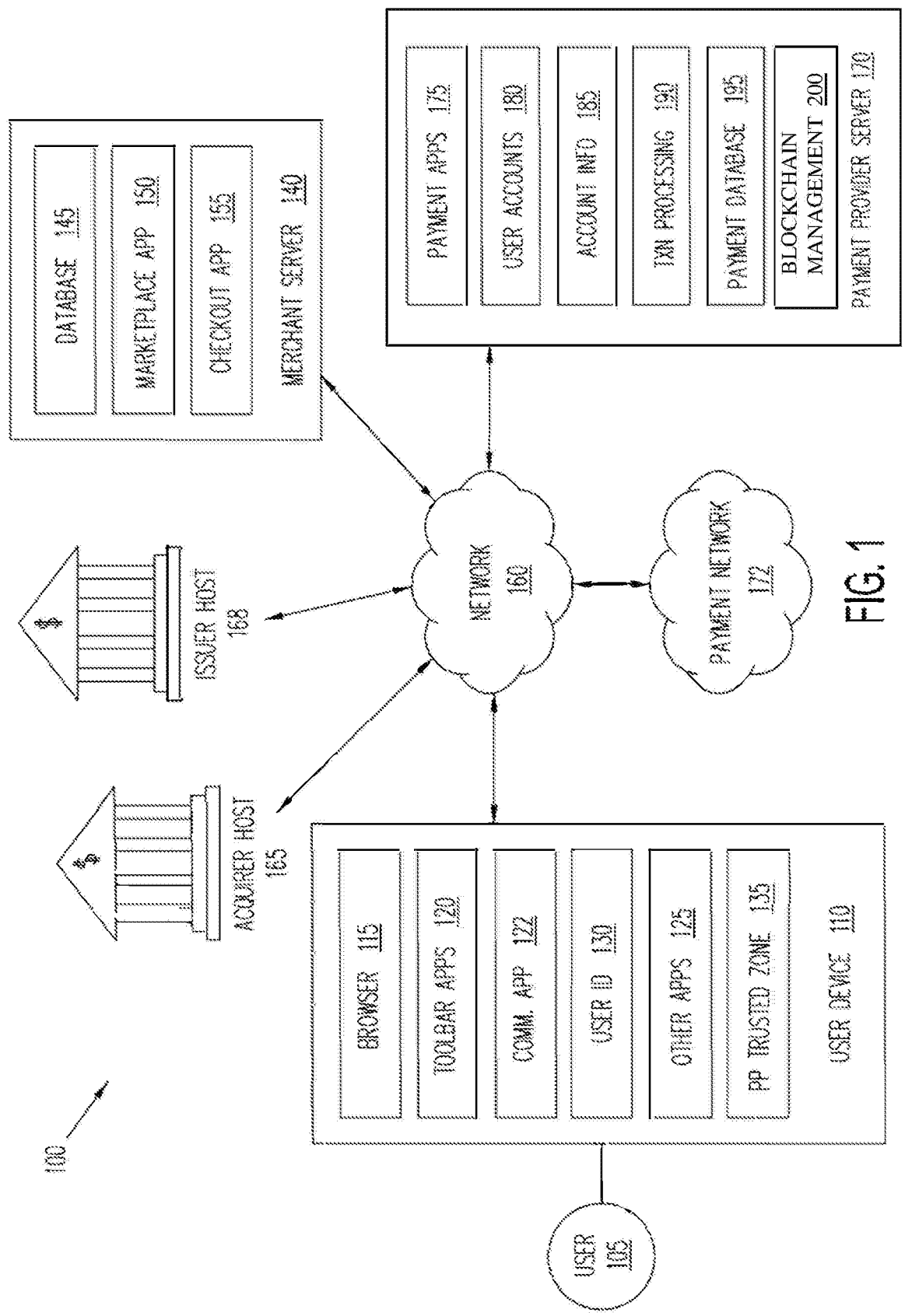
FIG. 1 is a block diagram of a networked system according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to systems and methods of determining the "relatedness" of seemingly separate transactions and consolidating data to be written to a blockchain system depending on the determined relatedness. For example, miners in a blockchain system may have a mempool that contains a list of transactions that have been mined but have not been written to the main blockchain system yet. In other words, the mempool may serve as a temporary storage place for the mined transactions. Eventually the transactions stored in the mempool will be written into the blockchain system. The transactions in the mempool may have priority levels that dictate when (or how soon) the transaction should be written into the blockchain system. However, under conventional blockchain schemes, the transactions in the mempool may be arranged in an ad hoc sequence. In such a scheme, two transactions that are actually related may still be treated as two different transactions and may have differing levels of priority. Consequently, though the transactions are related, they may still be written into the blockchain system as two different transactions, and likely are different times too. This leads to waste of resources and inefficiencies. For example, more computing resources are used to perform the separate blockchain writing, and the blockchain length is also increased unnecessarily.

The present disclosure pertains to an improved blockchain system, where the relatedness of multiple transactions is determined. As non-limiting examples, multiple transactions may be determined to be related, for example if they are conducted by the same party/parties, with the same merchant, paid by the same payment instrument, processed by the same payment processor, and/or originate from the same location or within a predetermined time frame within one another. Once multiple transactions are determined to be related, the data associated with them may be aggregated such that the aggregated data is written into a single block of the blockchain system. To facilitate the aggregated data writing into the single block, the priority levels of the transactions are also re-assigned. For example, if the transactions had different priority levels before, they may be assigned the same priority level in order to facilitate the aggregated data being written together into the same block of the blockchain system. In some embodiments, the reprioritization may also involve increasing the priority levels of the transactions. For example, a transaction A may initially have a priority level 2, and a transactions B may initially have a priority level 3. Upon determining that the transactions A and B are related, they may each be reprioritized to a priority level 1, so as to expedite the writing of their aggregated data into the blockchain system. In some embodiments, if the different transaction data are written into different blocks of the blockchain system, the blocks may be consecutive blocks. The various aspects of the present disclosure are discussed below in more detail with reference to FIGS. 1-8.

FIG. 1 is a block diagram of a networked system or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal, Inc. of San Jose, CA. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an IPAD™ from APPLE™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

In conjunction with user identifiers 130, user device 110 may also include a trusted zone 135 owned or provisioned by the payment service provider with agreement from a device manufacturer. The trusted zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider, which includes communication of data or information needed to complete the request, such as funding source information.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, a blockchain management application 200 may also be implemented on or otherwise accessible by the payment provider server 170. The blockchain management application 200 may include one or more software applications or software programs that can be automatically executed (e.g., without explicit instructions from a human user) to perform certain tasks. For example, the blockchain management application 200 may evaluate mined blockchain transactions to determine their "relatedness." The relatedness of seemingly separate transactions may be established based on factors that include, but are not limited to: whether the transactions are conducted by the same party/parties, with the same merchant, paid by the same payment instrument, processed by the same payment processor, originate from the same location or within a predetermined time frame within one another, share tenants, etc., though the multiple transactions need not meet all of the factors listed above to be considered related.

In some embodiments, the blockchain management application 200 may use a scoring system to determine whether seemingly separate transactions are indeed related. For example, two seemingly separate transactions may initially start with a relatedness score of 0. If the blockchain management application 200 determines that the two transactions have the same parties (e.g., same payor and same payee), it will raise the relatedness score by a predefined amount. If the blockchain management application 200 determines that the two transactions share the same merchant (e.g., a restaurant), it will raise the relatedness score by a predefined amount. If the blockchain management application 200 determines that the two transactions are processed using same payment processor (e.g., both using PAYPAL®) it will raise the relatedness score by a predefined amount. If the blockchain management application 200 determines that the two transactions occurred at the same location (e.g., the same GPS coordinates), it will raise the relatedness score by a predefined amount. If the blockchain management application 200 determines that the two transactions occurred within a predetermined time frame from each other (e.g., by less than 2 minutes), it will raise the relatedness score by a predefined amount. The above are non-limiting examples of how meta data or data about the transactions can be used to calculate the relatedness score. When the relatedness score exceeds a predefined threshold, the blockchain management application 200 may determine that the transactions are related or have originated from the same underlying event. Otherwise, the blockchain management application 200 may deem the transactions as not being related to each other.

Once the transactions are determined to be related, their transaction data are aggregated and written to a single block of a blockchain. For example, suppose that 3 users A, B, and C (who may be friends) conduct transactions with one another at a location D, which may be them having lunch together and then paying their lunch bills separately. The transactions among these users, the associated meta data, and the transaction processor's name (e.g., PAYPAL®) may be aggregated over a predetermined time frame (e.g., 2 minutes). The meta data may include data such as location of the transaction, transaction notes, social engine mode (if sharing is involved), etc. According to the present disclosure, instead of feeding the data for each transaction to different blocks of a blockchain system, the data for these related transactions may be aggregated and fed to a single block of a blockchain, which may be considered a contextual block. As a result, the length of the blockchain system is reduced, since the aggregated data now only occupies one block, as opposed to having data from multiple transactions occupy multiple blocks under conventional blockchain schemes.

It is understood that the data aggregation may involve re-assigning the priority levels of the transactions in a mempool. In that regard, a mempool in a blockchain system is a temporary storage space for mined blockchain transactions that have not yet been written into the blockchain system. Each transaction may have its own initial priority level. For example, in the example transaction involving the users A, B, and C above, the transaction involving user A paying for his lunch bill may have a priority level 1, the transaction involving user B paying for his lunch bill may have a priority level 3, and the transaction involving user C paying for his lunch bill may have a priority level 2. Due to these different priority levels, the transactions involving users A, B, and C would have been written into the blockchain system at different times (e.g., transaction involving user A first, transaction involving C second, and transaction involving user B the last), and into separate blockchain blocks. However, upon determining that these three transactions are actually related to one another (e.g., originating from the same underlying event), the blockchain management application 200 herein may reassign the priority levels of the three transactions so as to facilitate them being written into the same blockchain block in some embodiments, or into consecutive blocks in other embodiments. In In some embodiments, the reprioritizing may involve adjusting the priority levels of the three transactions such that they all have the same priority level (e.g., all with the priority level 2, or all with the priority level 1). In some embodiments, the adjusting the priority levels of the transactions may also involve increasing the priority level for at least some of the transactions in the group (e.g., the transactions involving B and C being moved up to priority level 1).

It is understood that the miner may not have mined the related transactions at the same time. For example, the miner may have mined the transaction involving the user A first and have placed that transaction in the mempool. At some time later, the miner may be mining the transaction involving the user B. As the transaction involving user B is being mined (or has just finished mining), the miner may compare the data of the transaction involving user B with the data of the transaction involving user A that is already saved in the mempool. Based on a set of predefined rules (e.g., do these transactions share common participants, common location, common merchant, occurred within a predefined time frame, etc.), the miner may determine that these transactions are related. The predefined rules may weigh various factors equally or differently based on transaction data. The determination may then result in a number (e.g., 0 to 1 or equivalents), where the number exceeds a predetermined threshold for the transactions to be considered related. The threshold may be a number such as 0.5 or any number greater than 0.5 or their equivalents. As with the factors, the threshold may vary depending on the system and/or transaction data, e.g., with larger transaction amounts (such as above a certain dollar amount), the threshold may be higher than with a lower transaction amount. As a result, the priority levels of these transactions may be adjusted in the manner discussed above. One or more of the above steps may be performed by the blockchain management application 200.

In some embodiments, the blockchain management application 200 introduces an artificial delay with respect to when a transaction should be written into the blockchain system. For example, suppose that a transaction A is mined at a first point in time, and transaction B is mined at a second point in time after the first point in time. The data for the transactions A and B may be initially saved in the mempool. At a third point in time after the second point in time, transaction A should be written into the blockchain system according to transaction A's priority level in the mempool. Suppose that at the third point in time, the blockchain management application 200 may have determined that transactions A and B are related to each other, or that they could be related to each other but need more time to verify/confirm this determination. However, the priority levels of the transactions A and B have not been readjusted to take into account their potentially "relatedness", since the blockchain management application 200 may still be in the process of determining (or has just finished determining) their relatedness.

In order to avoid unnecessarily writing transactions A and B as two separate transactions into separate blocks of the blockchain system, the blockchain management application 200 introduces a delay for when transaction A should be written into the blockchain system. In some embodiments, the delay may be a predetermined amount of time, for example x number of minutes, hours, or days. In other embodiments, the delay may be the next available scheduled time slot (which may be predetermined) for writing data into the blockchain system. For example, instead of writing transaction A into the blockchain system at the third point in time, the transaction A may be scheduled to be written into the blockchain system at a fourth point in time after the third point in time. If transaction B is indeed determined to be related to transaction A, then the priority levels for both transactions A and B may be adjusted such that they can be written into the blockchain system at the fourth point in time together.

In some embodiments, the mining fee associated with the multiple transactions may be higher than conventional blockchain mining transactions. For example, the payment provider server 170 (via the blockchain management application 200) may award the miner who mined the related transactions an extra mining fee, as an incentive to mining the related transactions. As another example, suppose that there was a first mining fee associated with mining a transaction A and a second mining fee associated with mining a transaction B. The payment provider server 170 (via the blockchain management application 200) may determine that data for the different transactions A and B should be combined/consolidated and written into the same blockchain block. In response to this determination, a new mining fee for the consolidated transaction data may be calculated, where the new mining fee is greater than either the first mining fee or the second mining fee.

Although the blockchain management application 200 is shown as being implemented on the payment provider server 170 in the embodiment of FIG. 1, it is understood that it may also be sent (e.g., periodically or when needed) over the network 160 to the user device 110 or to the merchant server 140 for execution thereon. In some embodiments, the blockchain management application 200 (or an application similar to the blockchain management application 200) may already be implemented on the user device 110, or on the merchant server 140 instead of, or in addition to, it being implemented on the payment provider server 170. Further, although the blockchain management application 200 is illustrated as being separate from the transaction processing application 190 in the embodiment shown in FIG. 1, the transaction processing application 190 may implement some, or all, of the functionalities of the blockchain management application 200 in other embodiments. In other words, the blockchain management application 200 may be integrated within the transaction processing application 190 in some embodiments.

Still referring to FIG. 1, the payment network 172 may be operated by payment card service providers or card associations, such as DISCOVER®, VISA®, MASTERCARD®, AMERICAN EXPRESS®, REPAY®, CHINA UNION PAY®, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
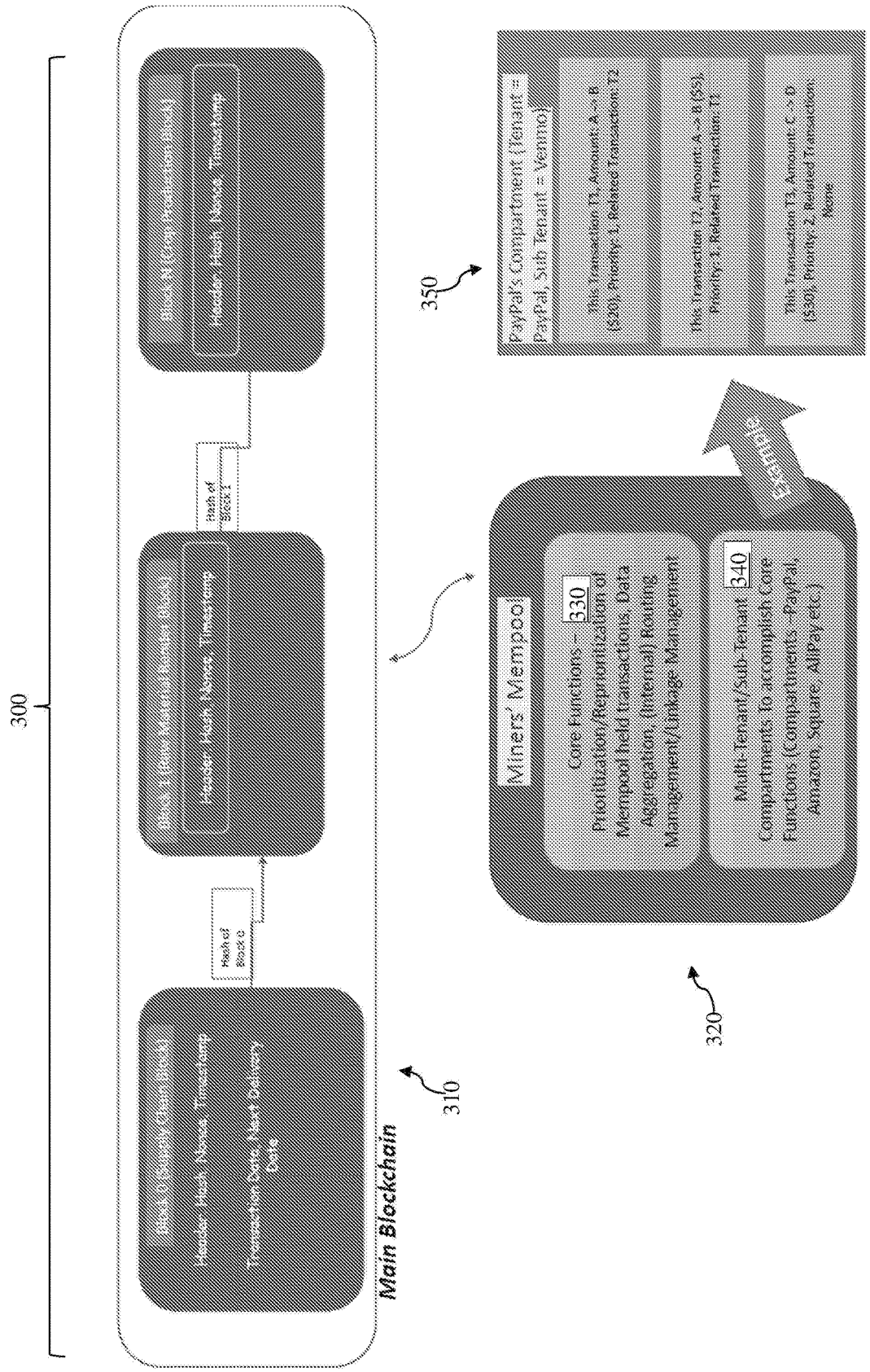
FIGS. 2-4 are block diagrams of a blockchain system according to various aspects of the present disclosure.

FIG. 2 illustrates an example use scenario involving the blockchain management application 200 and a blockchain system 300 according to various aspects of the present disclosure. The blockchain system 300 includes a main blockchain 310, which as illustrated is a simplified segment of what may be a much larger chain. The main blockchain 310 includes a block 0, a block 1, and a block N. The block 0 is a supply chain block, the block 1 is a raw materials render block, and the block N is a crop production block. Each of the blocks in the main blockchain 310 includes a respective header.hash, nonce, and a timestamp. The header.hash may serve as an identifier for the block. The header.hash for each block is also calculated as a function of the previous block's hash. For example, as shown in FIG. 2, block 0 sends the hash of block 0 to block 1, so that block 1 calculates its header.hash as a function of the hash of block 0. Block 1 sends the hash of block 1 to block N, so that block N calculates its header.hash as a function of the hash of block 1. The nonce may be a random or pseudo-random and arbitrary number used only once in a cryptographic communication. The nonce adds more variance to the block and makes it more difficult to generate a valid hash for a given block. The timestamp keeps track of the creation and modification of the transactions of the block. Each block may have its own appropriate contents, for example transaction data or next delivery date in block 0 (the contents of blocks 1 and N are not specifically illustrated herein for reasons of simplicity).

The blockchain system 300 also includes a mempool 320 of a miner. As discussed above, the mempool 320 may be considered a temporary storage space for storing mined transactions that have yet to be written into the main blockchain 310. The blockchain management application 200 discussed above, or its functionalities, may be implemented in the mempool 320. For example, the mempool 320 includes a Core Functions module 330 that is configured to determine the relatedness of seemingly separate transactions, prioritize/reprioritize the transactions in the mempool 320, aggregate the data from the related transactions, and manage or route the aggregated data (e.g., introducing a delay) to be fed to the main blockchain 310.

The mempool also includes a Multi-Tenant/Sub-Tenant module 340, which may be used to compartmentalize the transactions in a multi-tenant or sub-tenant context. In more detail, blockchain mining data associated with different financial entities (e.g., PAYPAL®, AMAZON®, SQUARE®, ALIPAY®) may be kept in different compartments. These different financial entities may be considered separate tenants. However, some tenants may be sub-tenants of other tenants. For example, VENMO® and PAYPAL® may be separate financial entities, but VENMO® is owned by PAYPAL® and is therefore considered a sub-tenant of PAYPAL®. The module 340 may store the transactions involving sub-tenants in the same compartment as the transactions involving the main tenant, and/or create additional sub-compartments within the main compartment in order to store the transactions involving the sub-tenants.

As a non-limiting example, FIG. 2 illustrates a compartment 350 of the mempool 320, which belongs to PAYPAL® in this case. In other words, PAYPAL® is the main tenant for the compartment 350 of the mempool 320. The compartment 350 may also contain transactions associated with VENMO®, which is the sub-tenant in this case. The compartment 350 contains three example mined blockchain transactions. In the mined blockchain transaction T1, a user A pays a user B $20. In the mined blockchain transaction T2, the user A pays the user B $5. In the mined blockchain transaction T3, a user C pays a user D $30. Users A, B, C, and D are both users of not only PAYPAL® but also VENMO®.

It may be advantageous to compartmentalize the storage of the mined blockchain transactions in the mempool 320 in accordance with their tenants/sub-tenants. For example, it may be easier to process the group of transactions within a compartment, as they may share certain common attributes. Another advantage is that the compartmentalized transaction data may be written to one or more blocks in the main blockchain 310 in a manner to indicate that they all share the common tenant. For example, all transactions associated with PAYPAL® may be compartmentalized in the mempool 320. When the compartmentalized mempool data involving PAYPAL® is written to the main blockchain 310, the header of the block may be updated to indicate that they contain transaction data involving PAYPAL®. For example, the header of a block may specify that tenant=PayPal, which signifies that this block contains PayPal-originated or culminated transactions between parties who use PayPal's services. In this manner, the blocks in the main blockchain 310 may be "branded" according to the tenants, which not only makes the data in the blocks more easily searchable/accessible, but also offers advertising opportunities.

According to the various aspects of the present disclosure, some of the transactions within a compartment may also be linked (e.g., related). In the example shown in FIG. 2, the transactions T1 and T2 may be determined to be linked at least in part based on their common tenants: VENMO® and PAYPAL®. For example, T1 and T2 may originate from the same underlying transaction, where T1 may be the payment for a purchase price, and T2 may be the payment for shipping related to the purchase. Of course, other factors discussed above may be considered in determining whether the transactions T1 and T2 should be linked together. For example, some of these factors may include merchant(s) with which the transactions T1 and T2 are conducted, payment instrument(s) or payment processor used for transactions T1 and T2, location(s) or time frames at which the transactions T1 and T2 are conducted, etc.

Linked transactions may be assigned a higher priority level. For example, transactions T1 and T2 may initially have been assigned lower priority levels than transaction T3, but after T1 and T2 have been linked together, their priority levels may be elevated, for example both elevated to priority level 1. In some embodiments, the priority level of transaction T3 (which has been determined to be unrelated to any other transaction) may actually be lowered (e.g., from a priority level 1 to a priority level 2) in order to accommodate the upward adjustment of the priority levels of the transactions T1 and T2. The data associated with the linked transactions T1 and T2 may be aggregated together and pushed to the main blockchain 310, and into the same block. The data associated with transaction T3 may be pushed to a different block of the main blockchain 310 at a later point in time.

According to the various aspects of the present disclosure, the blockchain miner may also prioritize tenants that have higher mining fees. For example, as discussed above, a miner may mine blockchain transactions from different tenants and store them in the mempool 320. Each of the tenants may have a respective mining fee associated with its transactions. For example, tenant A (e.g., PAYPAL®) may have a mining fee of $2 per transaction, whereas tenant B (e.g., AMAZON®) may have a mining fee of $3 per transaction. Based on the values of the mining fees, the mempool 320 may assign or reassign the priority levels of the transactions from tenant A and tenant B. In this example, since tenant B has a higher mining fee than tenant A, the mempool 320 may elevate the priority level of the transactions associated with tenant B, so that these transactions will be written to the main blockchain 310 sooner. This scheme of prioritization based on mining fees may be reciprocated across the spread of the mempool 320. Thus, when the mempool stores the transaction data of more than two tenants, the priority levels of the transaction data may be sorted or ranked according to the mining fees associated with the tenants.

Figure 3:
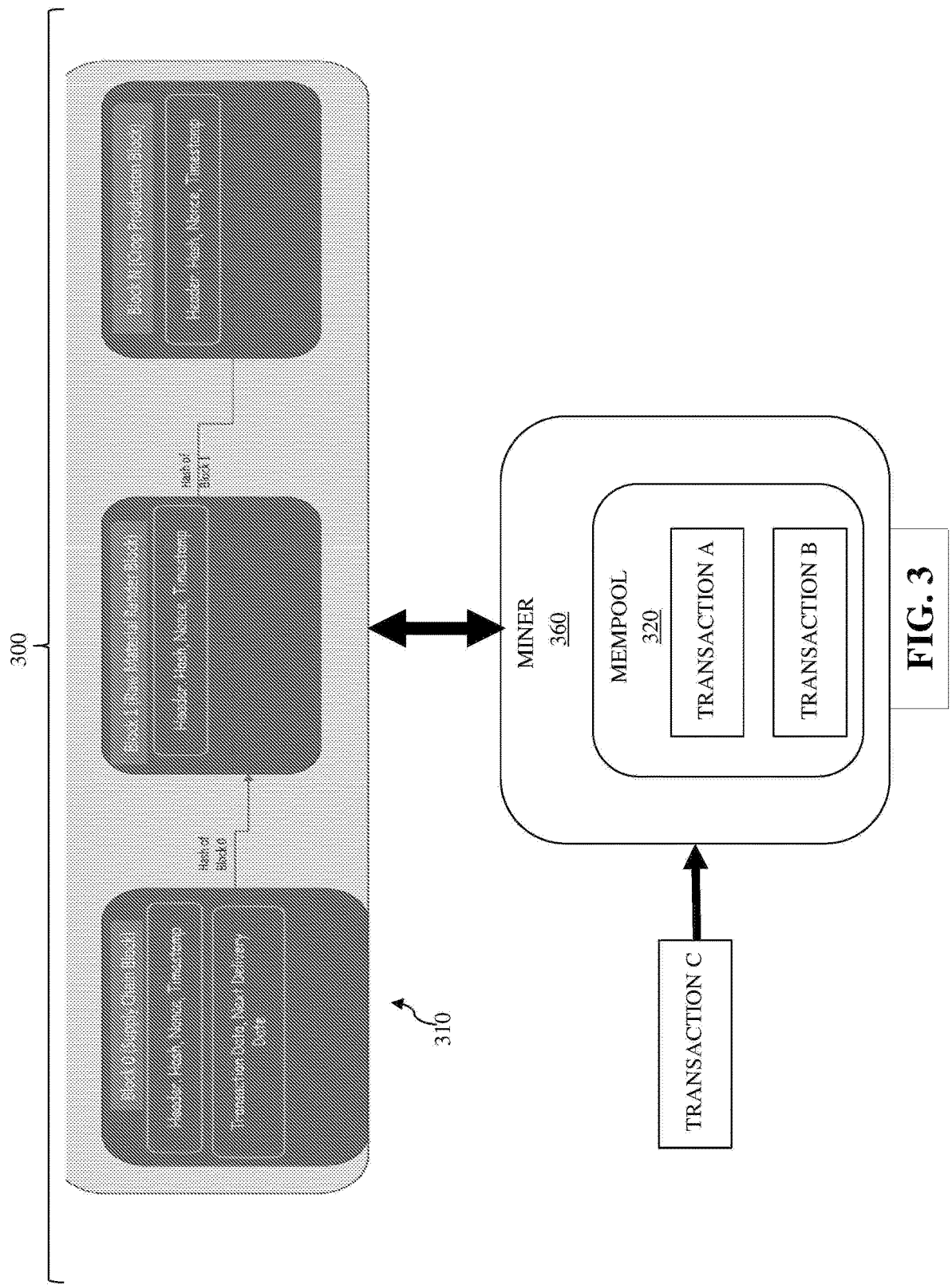

Another aspect of the present disclosure involves skipping/bypassing the mempool if certain criteria of a mined blockchain transaction are met. FIG. 3 is a block diagram that illustrates a non-limiting example of this scenario. The block diagram in FIG. 3 includes the main blockchain 310 as well as a miner 360 that is configured to mine blockchain transactions. The miner 360 may be a mobile device (e.g., a smartphone) of a user, a desktop or laptop computer of a user, or a server computer of a corporate entity. In various embodiments, the miner 360 may be implemented using the user device 110, the merchant server 140, or the payment provider 170. The blockchain management application 200 discussed above may be implemented as a part of the miner 360.

The miner 360 also includes a mempool, for example the mempool 320 discussed above. Currently, the mempool 320 has two transactions stored therein: transaction A and transaction B. While transactions A and B are still stored in the mempool 320 and are waiting for their turn to be written into the main blockchain 310, the miner 360 mines another transaction C. Suppose the mined meta data of transaction C indicates that it is a payment of $1000 from an entity M to an entity N, with a tenant name="IRS", a transaction type="Instant Funds Cash out/Refund", a fee=$5, a mempool exclusion flag="Yes". The mined meta data indicates that this transaction C should skip the mempool storage and should be written to the main blockchain 310 directly. For example, the mempool exclusion flag is "Yes", which may indicate that this transaction C is a high priority transaction and should skip the mempool storage. Other criteria that indicate the high priority of the transaction C include: the tenant name (e.g., IRS), the value of the transaction (e.g., greater than or equal to a predetermined threshold, such as $1000), and/or the nature of the transaction (e.g., cash out or refund). It is understood that the skipping of the mempool storage does not require not all of the above criteria to be met. In some embodiments, the mempool storage may be skipped (and the transaction is written directly into the main blockchain 310) when just one (or more) of the criteria is met. Furthermore, the criteria listed above are merely non-limiting examples, and they may be any other predetermined criteria in various embodiments.

In some embodiments, the skipping of the mempool storage is not performed merely due to the high priority of the incoming transaction, but also due to the lack of available storage in the mempool 320. For example, in some embodiments, the storage capacity limit of the mempool 320 is two transactions. In that case, the mempool 320 is already full with the transaction A and transaction B, and it does not have the available space to store another transaction C. As a result, the miner 360 may not store the transaction C in the mempool 320 and instead will write it directly to the main blockchain 310.

As another example, the miner 360 may determine that the mempool 320 will soon become unavailable. The unavailability of the mempool 320 may be due to the low battery of the miner 360, in other words, the battery or power source of the miner 360 may have reached a predetermined threshold (e.g., at or below 2% of battery capacity) and is about to shut off soon (e.g., in the next 5 minutes). The urgently anticipated shutdown of the miner 360 means that the mempool 320 is not a good candidate for storing the transaction C, and thus the miner 360 should write the transaction C directly to the main blockchain 310.

As yet another example, the miner 360 may determine that it is in an area with spotty or otherwise reliable network coverage/connectivity. For example, the miner 360 may determine, based on saved historical map or GPS (global positioning system) data, that it is located in, or is about to enter, a geographical region known to have poor network coverage (e.g., a mountainous region, or a building with poor cellular signal reception and no Wi-Fi). As another example, the miner 360 may periodically monitor the strength of its network signals. Based on the monitoring, the miner 360 may determine that it is entering a region with unreliable network coverage, for example in response to determining that the network signal strength is varying too much or is unavailable for an extended period of time. Regardless of how the unreliable network coverage/connectivity is determined, once it is determined, the miner 360 may skip saving the incoming transactions (such as transaction C) into the mempool 320 and instead write it directly to the main blockchain 310.

Figure 4:
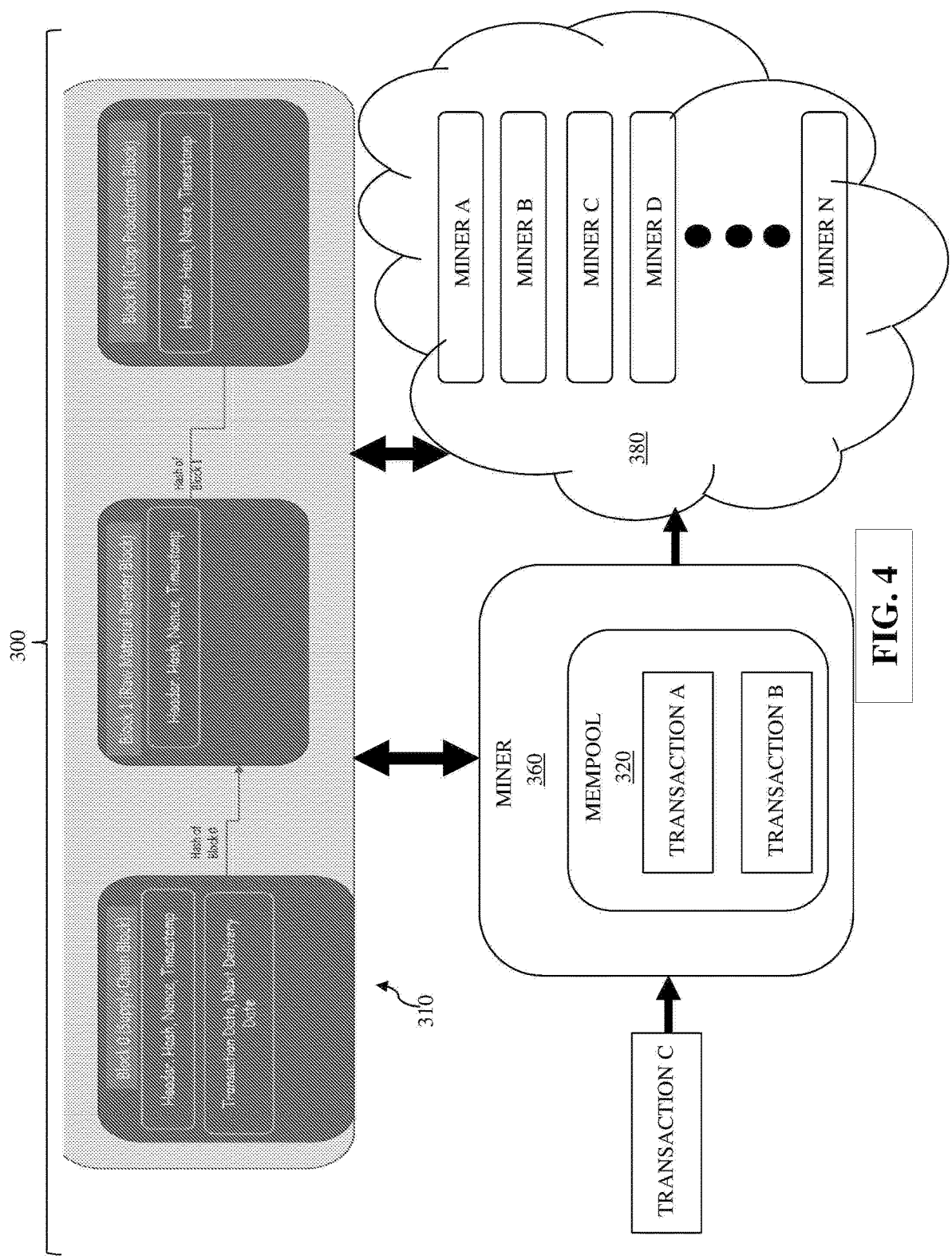

FIG. 4 is a block diagram that illustrates another scenario in which an incoming mined blockchain transaction skips the mempool storage of the miner 360 that mined the transaction. For reasons of simplicity and consistency, similar components that appear in both FIG. 3 and FIG. 4 will be labeled the same. Referring to FIG. 4, suppose that the miner 360 has transactions A and B stored in its mempool 320, which is at or near its storage capacity with the two transactions A and B stored therein. When miner 360 mines the transaction C, it may determine that the mempool 320 does not have sufficient storage capacity to store the transaction C. The miner 360 therefore broadcasts a message to a network 380 comprised of other miners of a blockchain, for example miners A, B, C, D, ... and N. In the broadcasted message, the miner 360 may request to lease or temporarily rent the mempool storage of one or more of the miners in the network 380, such that the data of the transaction C may be stored in the leased/rented mempool of the miner agreeing to the request. In exchange, the miner 360 may pay a brokerage fee to the miner agreeing to lease its mempool. The brokerage fee may be paid in part or in full after the other miner pushes the transaction C from its mempool onto the main blockchain 310. In some embodiments, the agreement between the two (or more) miners may be created via a "smart contract", which is created, executed, and/or enforced without human interaction, for example in a blockchain or distributed ledge context.

It is understood that in addition to the storage of the mempool 320 being full, the miner 360 may generate the broadcast message to the network 380 in response to a determination that the mempool 320 will become unavailable, for example due to a low battery status of the miner 360 or a determination that the miner 360 is at or will be entering a region with poor network coverage/connectivity, as discussed above. Under these circumstances, a consenting miner may agree to have its mempool leased by the miner 360 to store the data of the transaction C, which will be pushed onto the main blockchain 310 by the consenting miner eventually.

Figure 5:
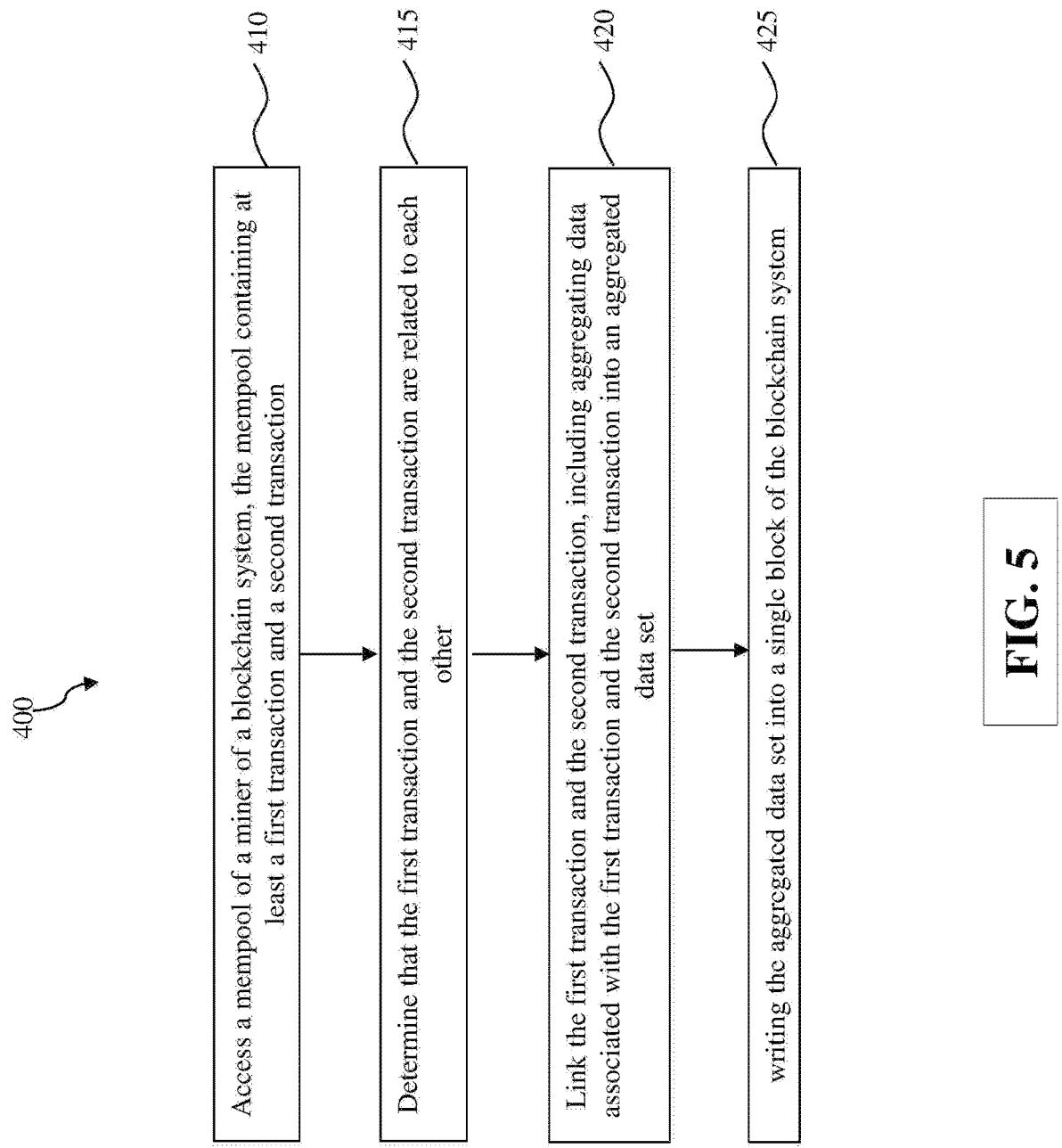
FIGS. 5-6 are flowcharts illustrating methods involving blockchains according to various aspects of the present disclosure.

FIG. 5 is a flowchart illustrating a method 400 for writing to a blockchain based on the relatedness of transactions according to various aspects of the present disclosure. The method 400 includes a step 410 to access a mempool of a miner of a blockchain system. The mempool contains at least a first transaction and a second transaction.

The method 400 includes a step 415 to determine that the first transaction and the second transaction are related to each other.

The method 400 includes a step 420 to linking the first transaction and the second transaction, including aggregating data associated with the first transaction and the second transaction into an aggregated data set. The step 420 may be performed in response to the determination made in step 415.

The method 400 includes a step 425 to write the aggregated data set into a single block of the blockchain system.

In some embodiments, the first transaction and the second transaction each include a respective priority for being written into the blockchain system, and the linking in step 420 comprises reassigning a priority of at least the first transaction or the second transaction. In some embodiments, the reassigning the priority comprises elevating the priority of at least the first transaction or the second transaction. In some embodiments, the reassigning the priority comprises assigning a same priority to both the first transaction and the second transaction.

In some embodiments, the determination of step 415 comprises determining that the first transaction and the second transaction share a common user, a common merchant, a common payment processor, a common location, or are performed within a predetermined time period within each other.

In some embodiments, the determination of step 415 comprises determining that the first transaction and the second transaction originated from a same underlying event.

It is understood that additional method steps may be performed before, during, or after the steps 410-425 discussed above. For example, the method 400 may include a step of introducing a delay for writing the first transaction or the second transaction into the blockchain system until the determining has been completed. As another example, the method 400 may include a step of storing transaction data from different tenants in different compartments of the mempool. As yet another example, the method 400 may include steps of writing a name of a first tenant into a header of a selected block of the blockchain system, and writing transaction data associated only with the first tenant into the selected block. As a further example, the mempool further contains a third transaction and a fourth transaction, and wherein the method 400 further includes the following steps: determining a first mining fee associated with mining the third transaction and a second mining fee associated with mining the fourth transaction; and assigning a higher priority to the third transaction in response to determining that the first mining fee is greater than the second mining fee; or assigning a higher priority to the fourth transaction in response to determining that the second mining fee is greater than the first mining fee. For reasons of simplicity, other additional steps are not discussed in detail herein.

Figure 6:
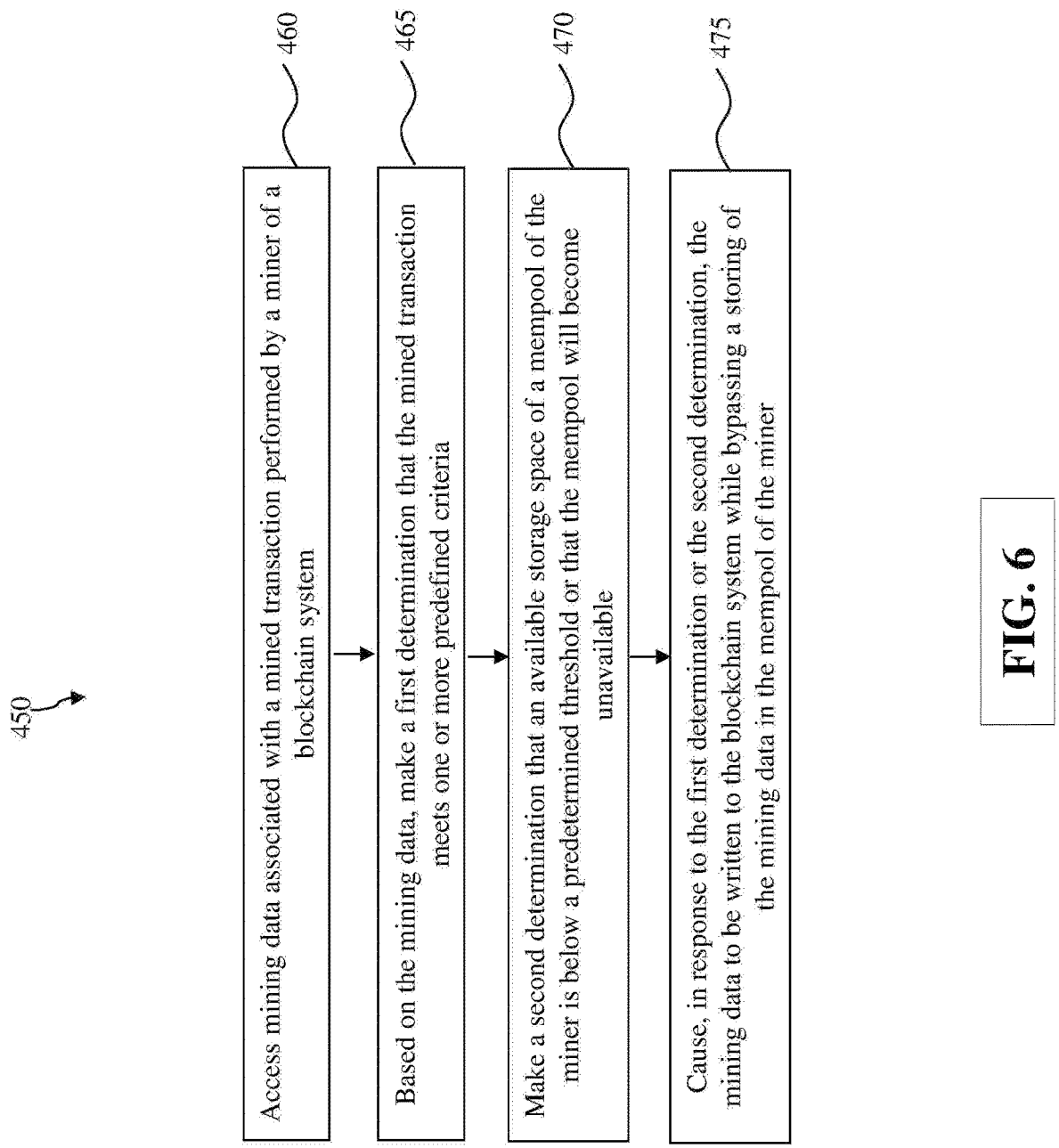

FIG. 6 is a flowchart illustrating a method 450 for writing to a blockchain by skipping a mempool according to various aspects of the present disclosure. The method 450 includes a step 460 to access mining data associated with a mined transaction performed by a miner of a blockchain system.

The method 450 includes a step 465 to make a first determination that the mined transaction meets one or more predefined criteria. The step 465 is performed based on the mining data.

The method 450 includes a step 470 to make a second determination that an available storage space of a mempool of the miner is below a predetermined threshold or that the mempool will become unavailable.

The method 450 includes a step 475 to cause, in response to the first determination or the second determination, the mining data to be written to the blockchain system while bypassing a storing of the mining data in the mempool of the miner.

In some embodiments, the step 475 comprises writing the mining data directly to the blockchain system without first storing the mining data in the mempool of the miner.

The method 450 includes a step 475 comprises: broadcasting, to a network comprising a plurality of miners of the blockchain system, a request to lease a mempool from at least one of the miners, receiving consent from one or more miners of the network to lease their mempools, and sending the mining data to the one or more miners for storage in their mempools.

In some embodiments, the first determination is made by determining that the mined transaction is associated with a predetermined tenant or has a value exceeding a predefined amount.

In some embodiments, the second determination is made by determining that the miner is performing mining operations using a device whose battery has dropped below a predefined percentage, or that the device is located within, or will be entering, an area with unreliable network coverage or unreliable connectivity.

Based on the above discussions, it can be seen that the present disclosure offers several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, by implementing the blockchain management application 200 as discussed above, the data from seeming-separate-but-actually-related transactions can be written into the same block of a blockchain. As a result, the length of the blockchain may be reduced. As a result, the present disclosure saves computer resources (e.g., fewer blocks) and enhances the efficiency of managing and/or traversing through a blockchain, since there are fewer blocks. The present disclosure further improves the functionality of a computer by enhancing the speed at which transactions can be saved in a blockchain, since the blockchain management application 200 is executed automatically and does not rely on manual human user's input (which may be slow) to complete the transactions. Other advantages include compatibility with existing blockchain systems and ease and low cost of implementation.

Figure 7:
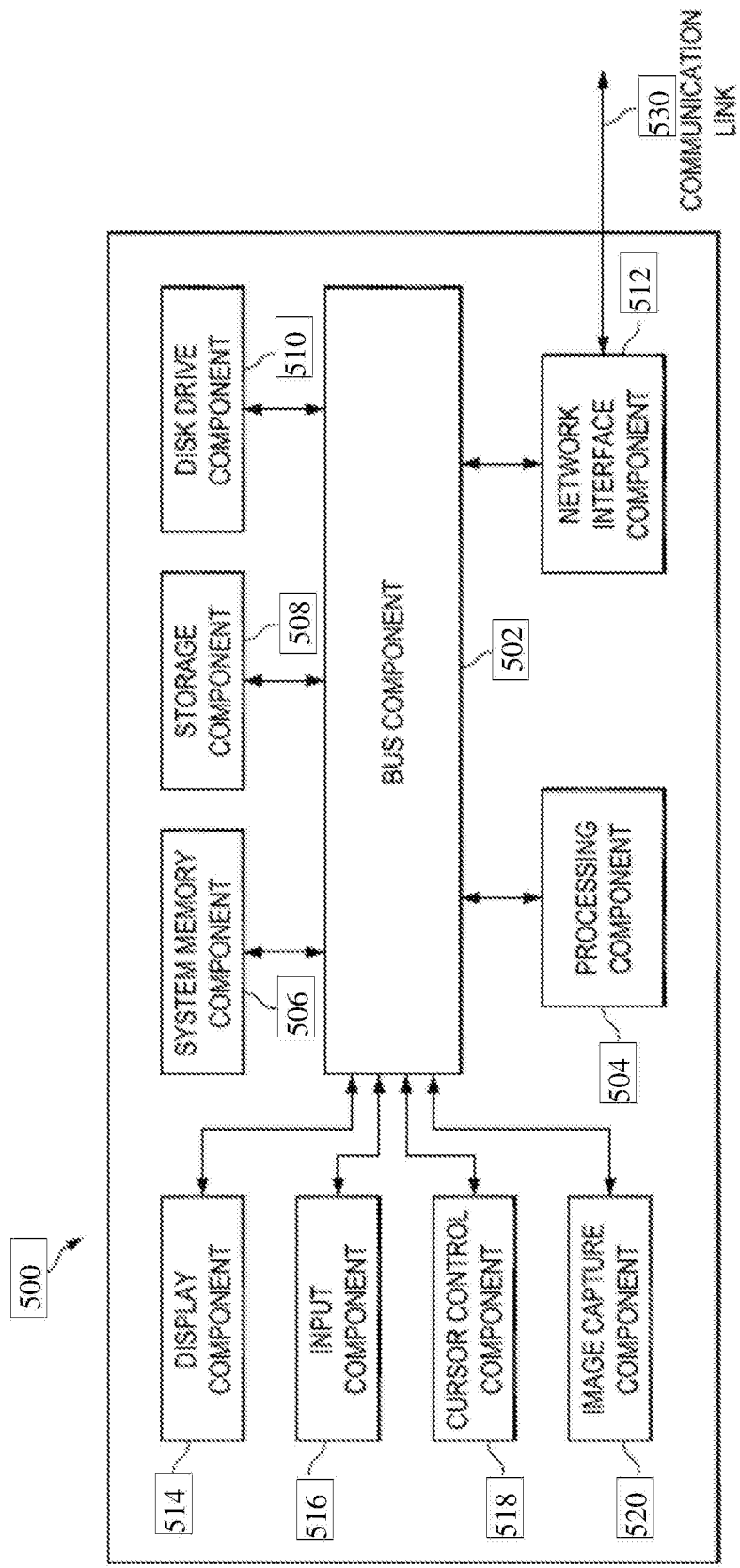
FIG. 7 is an example computer system according to various aspects of the present disclosure.

FIG. 7 is a block diagram of a computer system 500 suitable for implementing various methods and devices described herein, for example, the blockchain management application 200 and the various method steps of the methods 400 and 450, or the user device 110, the merchant server 140, or the payment provider server 170. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the blockchain management application 200 and the various method steps of the methods 400 and 450 (or the user device 110, the merchant server 140, or the payment provider server 170) may be implemented as the computer system 500 in a manner as follows.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components. In some embodiments, the mempool discussed above may be implemented using the system memory component 506 or the disk drive component 510. In some embodiments, the blockchain management application 200 may also be implemented at least partially within the system memory component 506 or the disk drive component 510.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the various components of the blockchain management application 200 (e.g., the execution engine 230) may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the mined blockchain transaction data.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the blockchain management application 200 and external devices, for example with the user device 110, with the merchant server 140, or with the payment provider server 170, depending on exactly where the blockchain management application 200 is implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the blockchain management application 200 may be implemented as such software code.

FIG. 7 illustrates an example cloud-based computing architecture 600, which may also be used to implement various aspects of the present disclosure. The cloud-based computing architecture 600 includes a mobile device 604 (e.g., the user device 110 of FIG. 1) and a computer 602 (e.g., the merchant server 140 or the payment provider server 170), both connected to a computer network 606 (e.g., the Internet or an intranet). In one example, a consumer has the mobile device 604 that is in communication with cloud-based resources 608, which may include one or more computers, such as server computers, with adequate memory resources to handle requests from a variety of users. A given embodiment may divide up the functionality between the mobile device 604 and the cloud-based resources 608 in any appropriate manner. For example, an app on mobile device 604 may perform basic input/output interactions with the user, but a majority of the processing and caching may be performed by the cloud-based resources 608. However, other divisions of responsibility are also possible in various embodiments. In some embodiments, using this cloud architecture, the blockchain management application 200 may reside on the user device 110, but its functionalities can be accessed or utilized by the merchant server 140 or by the payment provider server 170. Similarly, the blockchain management application 200 may reside on the merchant server 140 or on the payment provider server 170, but its functionalities may be accessed or utilized by the user device 110.

The cloud-based computing architecture 600 also includes the personal computer 602 in communication with the cloud-based resources 608. In one example, a participating merchant or consumer/user may access information from the cloud-based resources 608 by logging on to a merchant account or a user account at computer 602. The system and method involving the blockchain discussed above may be implemented at least in part based on the cloud-based computing architecture 600.

It is understood that the various components of cloud-based computing architecture 600 are shown as examples only. For instance, a given user may access the cloud-based resources 608 by a number of devices, not all of the devices being mobile devices. Similarly, a merchant or another user may access the cloud-based resources 608 from any number of suitable mobile or non-mobile devices. Furthermore, the cloud-based resources 608 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method that includes the following steps: accessing a mempool of a miner of a blockchain system, the mempool containing at least a first transaction and a second transaction; determining that the first transaction and the second transaction are related to each other; linking, in response to the determining, the first transaction and the second transaction, wherein the linking comprises aggregating data associated with the first transaction and the second transaction into an aggregated data set; and writing the aggregated data set into a single block of the blockchain system.

Another one aspect of the present disclosure involves a system that includes a non-transitory memory and one or more hardware processors coupled to the non-transitory memory and configured to read instructions from the non-transitory memory to cause the system to perform operations comprising: accessing a mempool of a miner of a blockchain system, the mempool containing at least a first transaction having a first priority and a second transaction with a second priority; determining whether the first transaction and the second transaction are related to each other based on one or more factors comprising: whether the first transaction and the second transaction share a common user, a common merchant, a common payment processor, or a common location, or are performed within a predetermined time period within each other; linking, in response to the determining indicating that the first transaction and the second transaction are related, the first transaction and the second transaction, wherein the linking comprises aggregating data associated with the first transaction and the second transaction into an aggregated data set and elevating at least one of the first priority or the second priority; and writing the aggregated data set into a single block of the blockchain system.

Yet another aspect of the present disclosure involves a method that includes the following steps: accessing mining data associated with a mined transaction performed by a miner of a blockchain system; based on the mining data, making a first determination that the mined transaction meets one or more predefined criteria; making a second determination that an available storage space of a mempool of the miner is below a predetermined threshold or that the mempool will become unavailable; and causing, in response to the first determination or the second determination, the mining data to be written to the blockchain system while bypassing a storing of the mining data in the mempool of the miner.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
accessing, by a system having one or more electronic processors, a mempool comprising a temporarily allocated electronic storage space of a miner blockchain system, wherein the mempool includes a plurality of transactions not yet permanently written into a blockchain associated with the miner blockchain system, wherein the mempool includes at least a first transaction not yet permanently written into the blockchain and at least a second transaction not yet permanently written into the blockchain, wherein the first transaction has a first temporary storage location within the mempool associated with a first initial priority level for being written by the miner blockchain system into a first block of the blockchain at a first time, and wherein the second transaction has a second temporary storage location within the mempool associated with a second initial priority level for being written by the miner blockchain system into a second block of the blockchain at a second time, wherein the second time is later than the first time;

determining, by the system having the one or more electronic processors, a relatedness score for the first transaction and second transaction by analyzing first transaction data for the first transaction and second transaction data for the second transaction, wherein the relatedness score is based on one or more of a same transferring party conducting the first and second transactions, a same receiving party for both the first and second transactions, a common funding source for both the first and second transactions, a common payment processor for both the first and second transactions, a common location of origination for both the first and second transactions, or a common time frame of origination for both the first and second transactions;

based on the relatedness score exceeding a threshold score, introducing, by the system having the one or more electronic processors, an artificial delay for the miner blockchain system permanently writing the first transaction into the blockchain and resetting both the first initial priority level and the second initial priority level to a same new priority level;

aggregating, by the system having the one or more electronic processors, the first transaction data and the second transaction data together into the second block for permanently writing into the blockchain, including:
  accessing the first temporary storage location within the mempool to read the first transaction data for the first transaction;
  accessing the second temporary storage location within the mempool to read the second transaction data for the second transaction;
  inserting the first transaction data and the second transaction data into the second block; and
  inserting transaction data into the second block for an additional plurality of other transactions stored at a plurality of different temporary locations within the mempool; and causing, by the system having the one or more electronic processors, the second block to be permanently written to the blockchain according to the same new priority level by transmitting the second block to a plurality of other computing devices corresponding to the blockchain.

2. The method of claim 1, further comprising:
causing the first block to be permanently written to the blockchain prior to completion of the artificial delay and prior to causing the second block to be permanently written to the blockchain, wherein the first block does not include the first transaction.

3. The method of claim 1, wherein the relatedness score is based on determining that the first transaction and the second transaction originated from a same underlying event.

4. The method of claim 1, further comprising: storing transaction data from different tenants in different compartments of the mempool.

5. The method of claim 1, wherein aggregating is based on a fee structure related to the first and second transactions.

6. The method of claim 1, wherein the artificial delay comprises a predetermined amount of time.

7. The method of claim 1, wherein the artificial delay corresponds to a next available scheduled time slot in which data is permitted to be permanently written to the blockchain.

8. A non-transitory computer-readable medium having stored thereon instructions executable by a computer system to cause the computer system to perform operations comprising:
accessing a mempool comprising a temporarily allocated electronic storage space of a miner blockchain system, wherein the mempool includes a plurality of transactions not yet permanently written into a blockchain associated with the miner blockchain system, wherein the mempool includes at least a first transaction not yet permanently written into the blockchain and at least a second transaction not yet permanently written into the blockchain, wherein the first transaction has a first temporary storage location within the mempool associated with a first initial priority level for being written by the miner blockchain system into a first block of the blockchain at a first time, and wherein the second transaction has a second temporary storage location within the mempool associated with a second initial priority level for being written by the miner blockchain system into a second block of the blockchain at a second time, wherein the second time is later than the first time;

determining a relatedness score for the first transaction and second transaction by analyzing first transaction data for the first transaction and second transaction data for the second transaction, wherein the relatedness score is based on one or more of a same transferring party conducting the first and second transactions, a same receiving party for both the first and second transactions, a common funding source for both the first and second transactions, a common payment processor for both the first and second transactions, a common location of origination for both the first and second transactions, or a common time frame of origination for both the first and second transactions;

based on the relatedness score exceeding a threshold score, introducing an artificial delay for the miner blockchain system permanently writing the first transaction into the blockchain and resetting both the first initial priority level and the second initial priority level to a same new priority level;

aggregating the first transaction data and the second transaction data together into the second block for permanently writing into the blockchain, including:
  accessing the first temporary storage location within the mempool to read the first transaction data for the first transaction;
  accessing the second temporary storage location within the mempool to read the second transaction data for the second transaction;
  inserting the first transaction data and the second transaction data into the second block together according to the same new priority level; and
  inserting transaction data into the second block for an additional plurality of other transactions stored at a plurality of different temporary locations within the mempool; and causing the second block to be permanently written to the blockchain by transmitting the second block to a plurality of other computing devices corresponding to the blockchain.

9. The non-transitory computer-readable medium of claim 8, wherein the operations further comprise:
  causing the first block to be permanently written to the blockchain prior to completion of the artificial delay and prior to causing the second block to be permanently written to the blockchain, wherein the first block does not include the first transaction.

10. The non-transitory computer-readable medium of claim 8, wherein the relatedness score is based on determining that the first transaction and the second transaction originated from a same underlying event.

11. The non-transitory computer-readable medium of claim 8, wherein the operations further comprise:
  storing transaction data from different tenants in different compartments of the mempool.

12. The non-transitory computer-readable medium of claim 8, wherein aggregating is based on a fee structure related to the first and second transactions.

13. The non-transitory computer-readable medium of claim 8, wherein the artificial delay comprises a predetermined amount of time.

14. The non-transitory computer-readable medium of claim 8, wherein the artificial delay corresponds to a next available scheduled time slot in which data is permitted to be permanently written to the blockchain.

15. A system, comprising:
  a processor; and
  a non-transitory computer-readable medium having stored thereon instructions executable by the system to cause the computer system to perform operations comprising:
    accessing a mempool comprising a temporarily allocated electronic storage space of a miner blockchain system, wherein the mempool includes a plurality of transactions not yet permanently written into a blockchain associated with the miner blockchain system, wherein the mempool includes at least a first transaction not yet permanently written into the blockchain and at least a second transaction not yet permanently written into the blockchain, wherein the first transaction has a first temporary storage location within the mempool associated with a first initial priority level for being written by the miner blockchain system into a first block of the blockchain at a first time, and wherein the second transaction has a second temporary storage location within the mempool associated with a second initial priority level for being written by the miner blockchain system into a second block of the blockchain at a second time, wherein the second time is later than the first time;
    determining a relatedness score for the first transaction and second transaction by analyzing first transaction data for the first transaction and second transaction data for the second transaction, wherein the relatedness score is based on one or more of a same transferring party conducting the first and second transactions, a same receiving party for both the first and second transactions, a common funding source for both the first and second transactions, a common payment processor for both the first and second transactions, a common location of origination for both the first and second transactions, or a common time frame of origination for both the first and second transactions;
    based on the relatedness score exceeding a threshold score, introducing an artificial delay for the miner blockchain system permanently writing the first transaction into the blockchain and resetting both the first initial priority level and the second initial priority level to a same new priority level;
    aggregating the first transaction data and the second transaction data together into the second block for permanently writing into the blockchain, including:
      accessing the first temporary storage location within the mempool to read the first transaction data for the first transaction;
      accessing the second temporary storage location within the mempool to read the second transaction data for the second transaction;
      inserting the first transaction data and the second transaction data into the second block; and
      inserting transaction data into the second block for an additional plurality of other transactions stored at a plurality of different temporary locations within the mempool; and
    causing the second block to be permanently written to the blockchain according to the same new priority level by transmitting the second block to a plurality of other computing devices corresponding to the blockchain.

16. The system of claim 15, wherein the operations further comprise:
  causing the first block to be permanently written to the blockchain prior to completion of the artificial delay and prior to causing the second block to be permanently written to the blockchain, wherein the first block does not include the first transaction.

17. The system of claim 15, wherein the relatedness score is based on determining that the first transaction and the second transaction originated from a same underlying event.

18. The system of claim 15, wherein aggregating the data is based on a fee structure related to the first and second transactions.

19. The system of claim 15, wherein the artificial delay comprises a predetermined amount of time.

20. The system of claim 15, wherein the artificial delay corresponds to a next available scheduled time slot in which data is permitted to be permanently written to the blockchain.

* * * * *

UNITED STATES PATENT AND TRADEMARK OFFICE
CERTIFICATE OF CORRECTION

| | | |
|---|---|---|
| PATENT NO. | : 11,922,414 B2 | |
| APPLICATION NO. | : 17/566382 | |
| DATED | : March 5, 2024 | |
| INVENTOR(S) | : Pankaj Sarin | |

It is certified that error appears in the above-identified patent and that said Letters Patent is hereby corrected as shown below:

In the Specification

Column 8, Line 64 "REPAY" should be changed to "RUPAY".

Signed and Sealed this
Seventh Day of May, 2024

*Katherine Kelly Vidal*

Katherine Kelly Vidal
*Director of the United States Patent and Trademark Office*